(12) United States Patent
Uetsuji et al.

(10) Patent No.: US 9,973,122 B2
(45) Date of Patent: May 15, 2018

(54) ELECTRIC MOTOR CONTROL DEVICE

(71) Applicant: KABUSHIKI KAISHA TOYOTA JIDOSHOKKI, Kariya-shi, Aichi (JP)

(72) Inventors: Kiyoshi Uetsuji, Kariya (JP); Satoshi Umemura, Kariya (JP); Yoshihiro Maeda, Kariya (JP); Makio Oshita, Kariya (JP); Toshihiro Yamamichi, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days. days.

(21) Appl. No.: 15/129,688

(22) PCT Filed: Feb. 13, 2015

(86) PCT No.: PCT/JP2015/053973
§ 371 (c)(1),
(2) Date: Sep. 27, 2016

(87) PCT Pub. No.: WO2015/146350
PCT Pub. Date: Oct. 1, 2015

(65) Prior Publication Data
US 2017/0133963 A1    May 11, 2017

(30) Foreign Application Priority Data

Mar. 28, 2014  (JP) .................................. 2014-068849
Sep. 9, 2014   (JP) .................................. 2014-182869

(51) Int. Cl.
*H02K 23/00*   (2006.01)
*H02P 6/20*    (2016.01)
(Continued)

(52) U.S. Cl.
CPC .............. *H02P 6/20* (2013.01); *B60R 16/033* (2013.01); *F02B 39/10* (2013.01);
(Continued)

(58) Field of Classification Search
CPC .................................. H02P 6/20; H02P 27/06
See application file for complete search history.

(56) References Cited

U.S. PATENT DOCUMENTS

2009/0269043 A1* 10/2009 Namuduri .............. B62D 5/046
                                                              388/819
2014/0077734 A1    3/2014 Toyoda
2015/0214875 A1    7/2015 Matsui et al.

FOREIGN PATENT DOCUMENTS

EP    1865172 A2    12/2007
JP    4-275093 A     9/1992
(Continued)

OTHER PUBLICATIONS

International Search Report for PCT/JP2015/053973 dated May 12, 2015 [PCT/ISA/210].

*Primary Examiner* — Karen Masih
(74) *Attorney, Agent, or Firm* — Sughrue Mion, PLLC (57) ABSTRACT

A sensorless electric motor control device is provided that completes a phase detection of a rotor before an activation signal is received, so as to shorten a time period from when the activation signal is received to when the rotor reaches a target number of rotations. The control device for a sensorless electric motor 10 includes an inverter 11 that drives the electric motor 10 and a first processor 18 that serves as a phase detection unit that causes the inverter 11 to perform a phase detection before the inverter 11 receives an activation signal that activates the electric motor 10, wherein the phase detection aligns a magnetic pole of a rotor of the electric motor 10 with a predetermined position with respect to a stator.

4 Claims, 6 Drawing Sheets (51) Int. Cl.

| | | |
|---|---|---|
| *H02P 27/06* | (2006.01) | |
| *H02P 6/18* | (2016.01) | |
| *B60R 16/033* | (2006.01) | |
| *F02B 39/10* | (2006.01) | |
| *F02D 41/00* | (2006.01) | |
| *F02D 41/26* | (2006.01) | |

(52) U.S. Cl.
CPC ......... *F02D 41/0007* (2013.01); *F02D 41/26* (2013.01); *H02P 6/18* (2013.01); *H02P 27/06* (2013.01); *B60Y 2400/112* (2013.01); *B60Y 2400/61* (2013.01); *F02D 2200/50* (2013.01); *F02D 2400/14* (2013.01)

(56) References Cited

FOREIGN PATENT DOCUMENTS

| JP | 8-266088 A | 10/1996 |
|---|---|---|
| JP | 11-318096 A | 11/1999 |
| JP | 2004-242422 A | 8/2004 |
| JP | 2007-127115 A | 5/2007 |
| JP | 2014-36536 A | 2/2014 |

\* cited by examiner

ELECTRIC MOTOR CONTROL DEVICE

CROSS REFERENCE TO RELATED APPLICATIONS

This application is a National Stage of International Application No. PCT/JP2015/053973, filed on Feb. 13, 2015, which claims priority from Japanese Patent Application No. 2014-068849, filed on Mar. 28, 2014, and Japanese Patent Application No. 2014-182869, filed on Sep. 9, 2014 the contents of all of which are incorporated herein by reference in their entirety.

TECHNICAL FIELD

The present invention relates to a sensorless electric motor control device.

RELATED ART

Upon activating an electric motor, a phase of a magnetic pole of a rotor is detected with respect to a stator in order to prevent a loss of synchronization. For a phase detection, a method is known that uses a sensor such as a resolver or a rotary encoder, but a method may be used that activates an electric motor in a sensorless state because the cost is increased and the size is made larger if a sensor such as those mentioned above is used.

However, when an electric motor is activated in a sensorless state, an inverter that supplies power to the electric motor receives an activation signal, sets the position of a magnetic pole of a rotor at a predetermined position with respect to a stator (phase detection), rotates the rotor after the phase detection is completed, and causes the number of rotations to reach a target number of rotations. Thus, there occurs a problem in which a time period from when an activation signal is received to when the number of rotations of the rotor reaches a target number of rotations becomes longer by a time period that does not contribute to an increase in the number of rotations of the rotor to reach the target number of rotations (a time period needed for a phase detection). Further, the time period needed for a phase detection accounts for a considerable proportion of the time period from when an activation signal is received to when the target number of rotations is reached.

A control device of an internal combustion engine is known that is not sensorless but performs a phase detection using a Hall sensor, so as to operate an electric motor properly upon operating a supercharger (see, for example, Patent Document 1).

CITATION LIST

Patent Document

Patent Document 1: Japanese Laid-open Patent Publication No. 2007-127115

SUMMARY OF INVENTION

Technical Problem

For example, an object of an electric supercharger that supercharges an internal combustion engine provided in a vehicle until a supercharger that supplies the internal combustion engine starts operating effectively is to speed up the vehicle to reach a target speed quickly. At that time, if it is possible to increase the number of rotations of a rotor of an electric motor provided in the electric supercharger to reach a target number of rotations in a short time, it is possible to speed up the vehicle to reach the target speed quickly. In other words, if it is possible to shorten the time period from when an activation signal that is output to an inverter upon pressing down on the accelerator is received to when the target number of rotations is reached, it is possible to speed up the vehicle to reach the target speed quickly. Thus, it is preferable that the time needed for a phase detection of the rotor, which does not contribute to a speeding up of the vehicle, be reduced.

It is an object of the present invention to provide a sensorless electric motor control device that completes a phase detection of a rotor before an activation signal is received, so as to shorten a time period from when the activation signal is received to when the rotor reaches a target number of rotations.

Solution to Problem

According to an aspect of the present invention, an electric motor control device includes an inverter and a controller.

The inverter supplies power to an electric motor that is a sensorless electric motor provided in a vehicle, so as to drive the electric motor. The controller controls the inverter. Further, the controller energizes the inverter upon detecting that an ignition switch has been turned on; and after the inverter is energized and before an activation control processor of the controller transmits, to the inverter, an activation signal that activates the electric motor, a phase detection unit of the controller causes the inverter to perform an initial phase alignment that aligns a magnetic pole of a rotor of the electric motor with a predetermined position with respect to a stator. During a period from the phase detection unit causing the inverter to perform the initial phase alignment to the activation control processor transmitting the activation signal to the inverter, a phase holding unit of the controller causes a holding current to be output to the inverter, the holding current holding the magnetic pole of the rotor of electric motor at the predetermined position with respect to the stator.

According to another aspect of the present invention, after the inverter that has received the activation signal drives the electric motor such that the number of rotations of the rotor reaches a target number of rotations, the phase detection unit causes the inverter to perform the initial phase alignment when the number of rotations of the rotor is not greater than a predetermined number of rotations.

According to yet another aspect of the present invention, after the number of rotations of the rotor is not greater than the predetermined number of rotations and the phase detection unit causes the inverter to perform the initial phase alignment, the phase holding unit causes a holding current to be output to the inverter, the holding current holding the magnetic pole of the rotor at the predetermined position.

According to yet another aspect of the present invention, the phase holding unit causes the holding current to be increased or decreased according to an amount of intake air obtained by measuring the inflow of air taken in by an impeller of a compressor connected to the rotor, and causes the holding current to be output to the inverter.

According to yet another aspect of the present invention, the electric motor control device controls the inverter provided in an electric supercharger and the electric motor.

Advantageous Effects of Invention

According to embodiments, an advantage is provided such that a time period from when an activation signal is received to when a rotor reaches a target number of rotations can be shortened.

DESCRIPTION OF EMBODIMENTS

Embodiments will now be described in detail with reference to the drawings.

Figure 1:
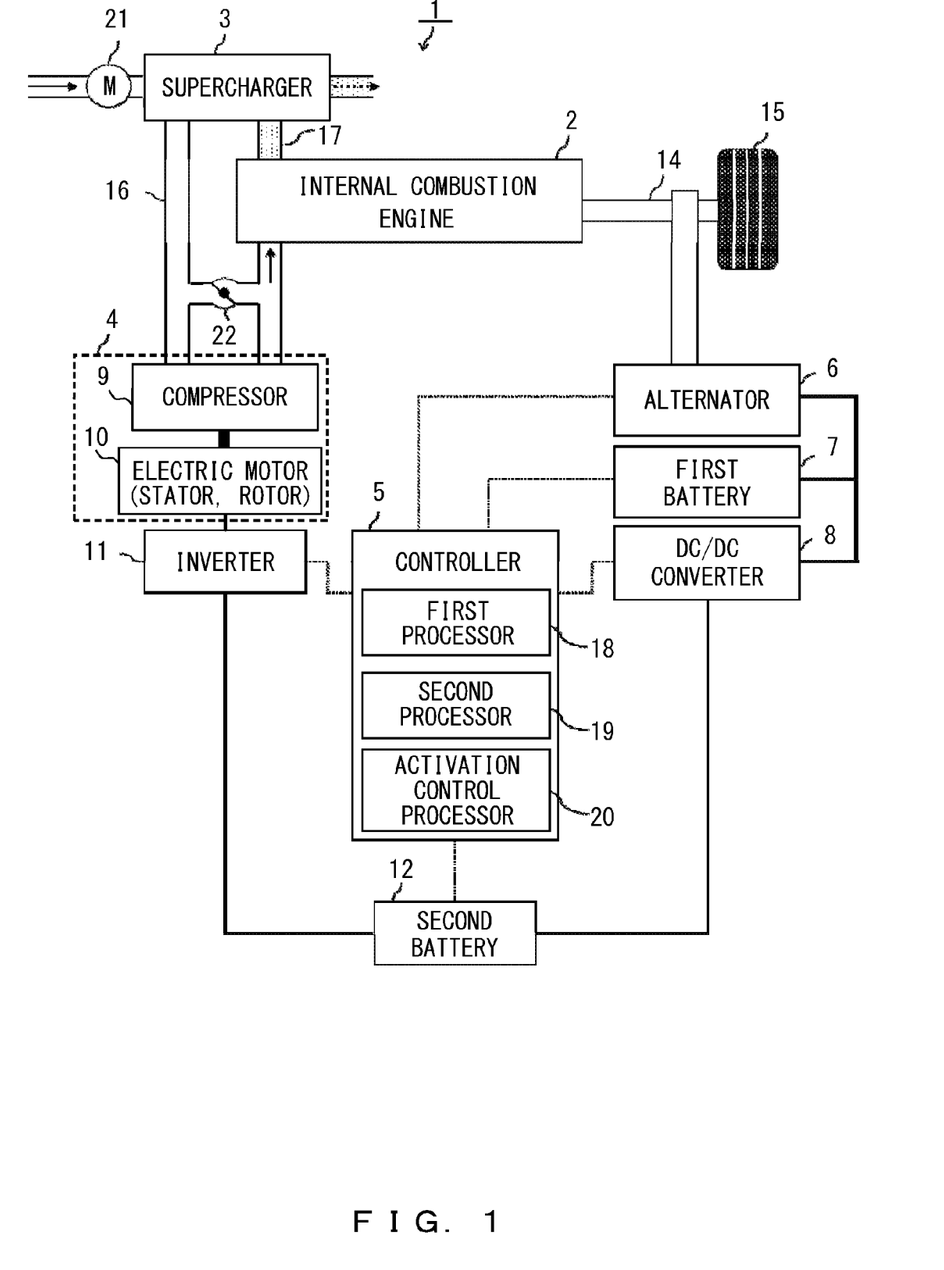
FIG. 1 illustrates an example of a control device provided in a vehicle, which includes an electric supercharger.

FIG. 1 illustrates an example of a device provided in a vehicle, which includes an electric supercharger. In this example, an electric motor in an electric supercharger is used for descriptions, but the electric motor is not limited to an electric motor provided in an electric supercharger.

A device 1 illustrated in FIG. 1 includes, for example, an internal combustion engine 2, a supercharger 3, an electric supercharger 4, a controller 5, an alternator 6, a first battery 7, a DC/DC converter 8, an inverter 11, and a second battery 12.

The internal combustion engine 2 is provided with an output axis 14, and a drive wheel 15 is coupled to the output axis 14 in this example. The supercharger 3 is a device that forces air into the internal combustion engine 2, which increases an output of the internal combustion engine 2. Pipes 16 and 17 are, for example, pipes that are used for supercharging.

The electric supercharger 4 is a device that includes a compressor 9 and an electric motor 10 and forces air into the internal combustion engine 2, and plays a role in, for example, assisting the supercharger 3. Power provided to the electric motor 10 that drives the compressor 9 is supplied by the inverter 11. The inverter 11 supplies power to the electric motor 10 according to an instruction given by the controller 5.

The alternator 6 is coupled to the output axis 14, and generates power using a rotational energy (rotational power) of the output axis 14, and the generated power is charged in the first battery 7 that is a secondary battery. The power generated by the alternator 6 also includes power generated as a brake regeneration. The power generated by the alternator 6 may be supplied to the second battery 12 through the DC/DC converter 8.

The first battery 7 is a secondary battery for supplying power to an auxiliary device or a system provided in a vehicle, and may be, for example, a lead-acid battery. However, the first battery 7 is not limited to the lead-acid battery.

The DC/DC converter 8 converts a voltage output from the first battery 7 into a voltage chargeable to the second battery 12, and uses the voltage to charge the second battery 12 from the first battery 7.

The second battery 12 is an assembled battery having one or more secondary batteries, and is charged with power provided from the DC/DC converter 8. It is preferable that the secondary battery used in the second battery 12 be a secondary battery, such as a lithium-ion battery, that can be charged and discharged in a short time. The secondary battery is not limited to the lithium-ion battery, and a storage element such as a nickel-metal hydride battery (Ni-MH), a lead-acid battery, and a capacitor may be used. Further, the second battery 12 may be included in, for example, a battery pack.

In the device of this example, power is supplied from the second battery 12 to the electric motor 10 though the inverter 11, but in a device that does not include the second battery 12, power for driving the electric motor 10 may be supplied from the first battery 7 to the inverter 11 through the DC/DC converter 8.

The controller 5 may be a circuit that uses, for example, a CPU (central processing unit), a multicore CPU, or a programmable device (such as an FPGA (field programmable gate array) and PLD (programmable logic device)), and the controller 5 reads a program that controls each unit and is stored in a storage provided inside or outside the controller 5, and executes the program. In this example, the controller 5 is used for descriptions, but the control performed by the controller 5 may be performed by one or more electronic control units (ECU) provided in a vehicle or one or more battery ECUs in a battery pack. The storage is, for example, a memory such as a read only memory (ROM) and a random access memory (RAM), and it may store therein data such as a parameter value and a variable value, or it may be used as a working area upon execution. The storage may be provided separately from the controller 5.

The controller 5 includes a first processor 18, a second processor 19, and an activation control processor 20.

The first processor is described.

The first processor 18 is a phase detection unit that causes the inverter 11 to perform an initial phase alignment (first processing) of the electric motor 10 before the inverter 11 receives an activation signal that activates the sensorless electric motor 10. The initial phase alignment is processing of aligning a magnetic pole of a rotor with a predetermined position with respect to a stator.

Figure 2:
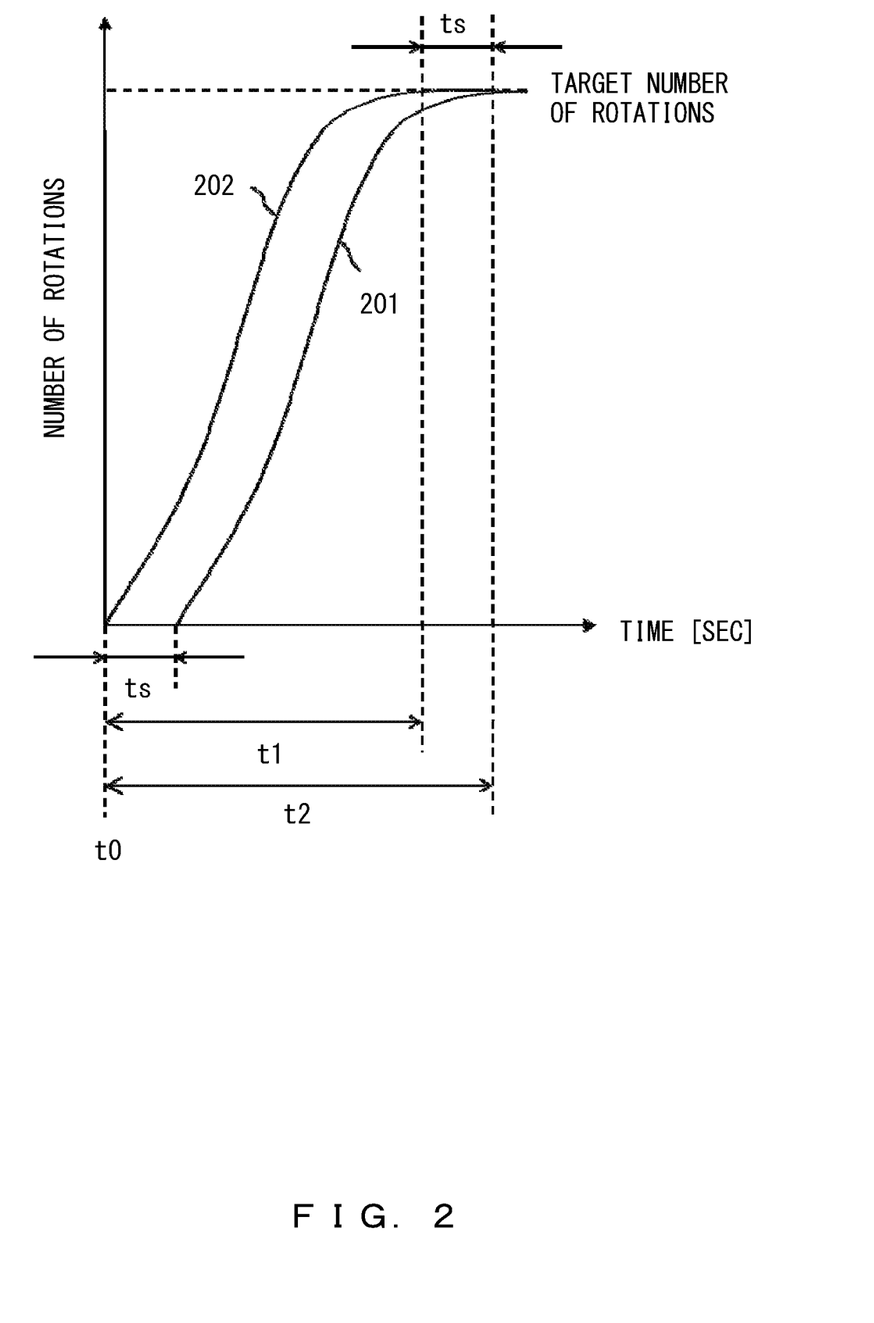
FIG. 2 illustrates an example of a state in a sensorless electric motor from when an inverter receives an activation signal to when a target number of rotations is reached.

FIG. 2 illustrates an example of a state in the sensorless electric motor from when the inverter receives an activation signal from the activation control processor 20 to when a target number of rotations is reached. A vertical axis represents the number of rotations of the rotor, and a horizontal axis represents a time. A curve 201 represents a change in the number of rotations when the first processing is performed on the electric motor 10 after the inverter 11 receives an activation signal (t0) (a change in the number of rotations in a conventional case). A curve 202 represents a change in the number of rotations when the electric supercharger 4 is provided and when the first processing is performed on the electric motor 10 before the inverter 11 receives an activation signal (t0) (a change in the number of rotations when the control according to the embodiments is used).

(1) When the sensorless electric motor 10 is activated, the first processing needs to be performed. When the first processing is started and completed after an activation signal is received (t0) as is conventional, a time period for phase detection (ts) from when the time at which the activation signal is received (t0) to when the first processing is completed is needed, as represented by the curb 201. The time period for phase detection (ts) is a small amount of time, but is wasted time which does not contribute to a time period (t2) from the time (t0) to when the number of rotations of the rotor reaches a target number of rotations. Further, the time period for phase detection (ts) accounts for a considerable proportion of the time period (t2). Thus, if the first processing is performed before the inverter 11 receives an activation signal (t0) as described above, a time period (t1) from when the activation signal is received (t0) to when the rotor reaches a target number of rotations is shortened (t1=t2−ts). This is represented by the curve 202.

Figure 3:
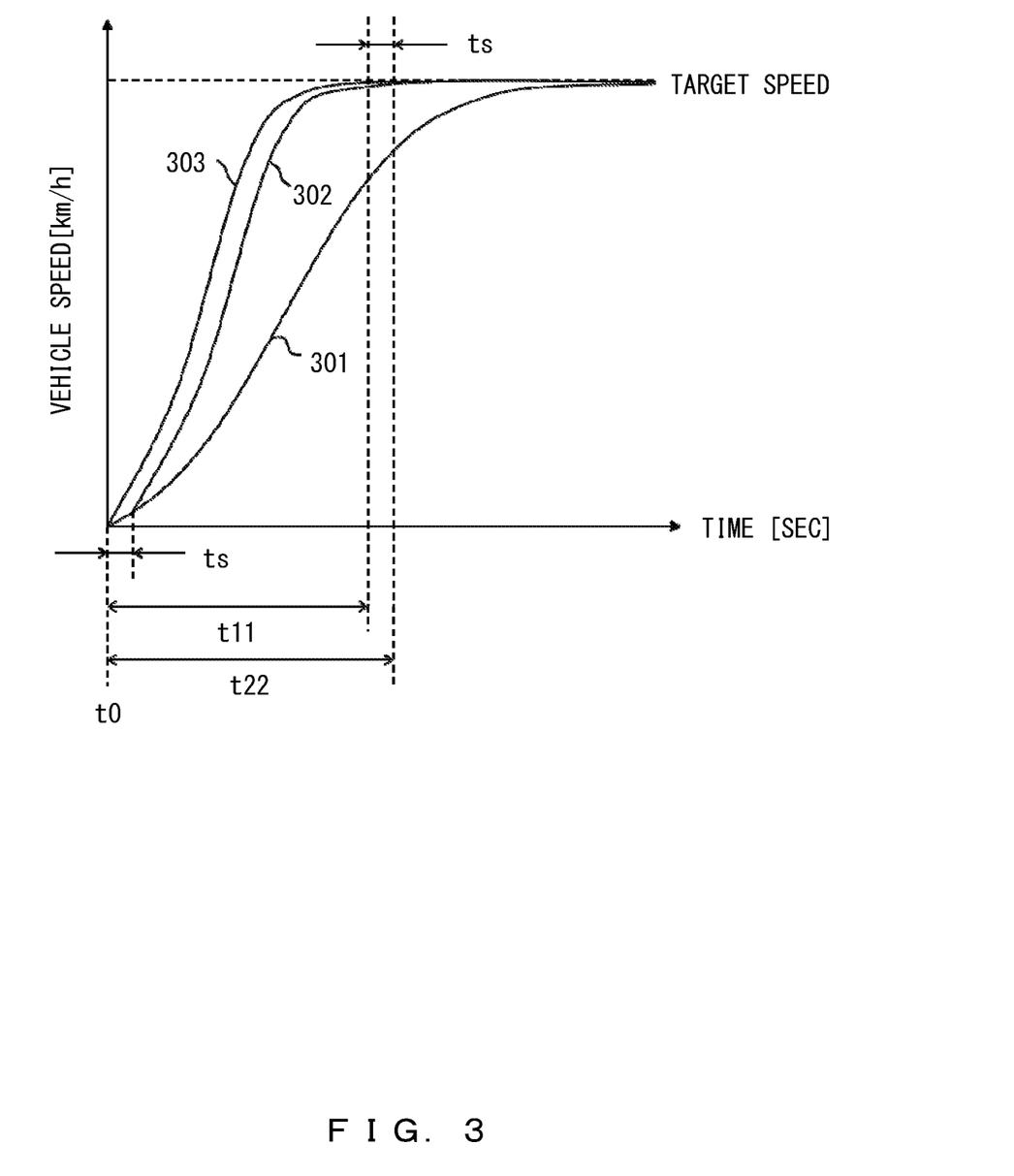
FIG. 3 illustrates an example of a state of a vehicle provided with the electric supercharger that has the sensorless electric motor from when an activation signal is received to when a target speed is reached.

FIG. 3 illustrates an example of a state of a vehicle provided with an electric supercharger that has the sensorless electric motor from when an activation signal is received from the activation control processor 20 to when a target speed is reached. A vertical axis represents a vehicle speed, and a horizontal axis represents a time. A curve 301 represents a change in vehicle speed when an electric supercharger is not provided (a change in vehicle speed when only an internal combustion engine is provided). A curve 302 represents a change in vehicle speed when the electric supercharger 4 is provided and when the first processing is performed on the electric motor 10 after the inverter 11 receives an activation signal (t0) (a change in vehicle speed when an internal combustion engine and an electric supercharger are provided in a conventional case). A curve 303 represents a change in vehicle speed when the electric supercharger 4 is provided and when the first processing is performed on the electric motor 10 before the inverter 11 receives an activation signal (t0) (a change in vehicle speed when an internal combustion engine and an electric supercharger are provided and when the control according to the embodiments is used).

(2) In the case of the electric supercharger 4 of the vehicle, if the first processing is performed before an activation signal is received (t0) as illustrated in FIG. 3 so as to shorten a time period (t11) from when the activation signal is received (t0) to when the rotor reaches a target number of rotations (t11=t22−ts), it is possible to cause the vehicle speed to reach a target speed earlier than when a conventional control is used. In the case of the electric supercharger 4 of a conventional vehicle, an activation signal is transmitted to the inverter 11 upon pressing down on the accelerator, the first processing is performed when the inverter 11 receives the activation signal (t0), the rotor of the electric motor 10 of the vehicle starts rotating, and supercharging from the compressor 9 to the internal combustion engine 2 is started. Then, a power supply to the electric motor 10 is stopped when the vehicle reaches the target speed. It is represented by the curve 302. As described above, also in the case of the electric motor 10 of the conventional vehicle, the time period for phase detection (ts) is wasted time which does not contribute to a speeding up to reach the target speed. Thus, if the first processing is completed before an activation signal is transmitted upon pressing down on the accelerator and is received (t0) by the inverter 11, it is possible to eliminate wasted time which does not contribute to a speeding up (t11=t22−ts). It is represented by the curve 303.

Further, the controller 5 determines, using the number of rotations of the rotor that is monitored by the inverter 11, whether the number of rotations of the rotor is not greater than a predetermined number of rotations Nth, and when it is not greater than the predetermined number of rotations Nth, the controller 5 forces the inverter 11 to perform the first processing.

(3) When the rotor of the electric motor 10 is rotated upon receiving an activation signal and then the number of rotations of the rotor reaches a target number of rotations, the power supply from the inverter 11 to the conventional electric motor 10 is stopped. However, the rotation of the rotor is not stopped immediately due to inertia but continues (free running). Besides, when the number of rotations of the rotor is not greater than the predetermined number of rotations Nth while free running, it is not possible to perform a phase estimation. For example, when the inverter 11 monitors an induced voltage of the electric motor 10 to perform a phase estimation of the rotor, the induced voltage is proportional to the number of rotations, so it is not possible to perform a phase estimation when the number of rotations of the rotor is not greater than the predetermined number of rotations Nth that indicates a limit for detecting an induced voltage. At this point, if the first processing is performed after a new activation signal is received as is conventional, the inverter 11 delays rotating the rotor of the electric motor 10 by the time period for phase detection (ts). Thus, if the first processing is forcibly performed when the number of rotations of the rotor is not greater than the predetermined number of rotations Nth, this results in shortening a time period from when an activation signal is received (t0) to when the rotor reaches the target number of rotations. The predetermined number of rotations is, for example, the number of rotations that indicates a limit for detecting an induced voltage.

(4) Also in the case of the electric supercharger 4 of the vehicle, if the first processing is forcibly performed when the number of rotations of the rotor is not greater than the predetermined number of rotations Nth and if the first processing is completed before an activation signal is transmitted from the activation control processor 20 to the inverter 11 upon pressing down on the accelerator, this results in shortening a time period from when the activation signal is received (t0) to when the rotor reaches a target number of rotations. It is not possible to perform a phase estimation when the number of rotations of the rotor of the electric motor 10 of the vehicle is not greater than the predetermined number of rotations Nth that indicates a limit for detecting an induced voltage. At this point, if the accelerator is pressed down and the first processing is performed after a new activation signal is received (t0), the inverter 11 delays rotating the rotor of the electric motor 10 by the time period for phase detection (ts), as is conventional. As a result, the vehicle delays increasing its speed to reach a target speed due to the time period for phase detection (ts). Thus, if the first processing is forcibly performed when the number of rotations of the rotor is not greater than the predetermined number of rotations Nth, this results in shortening a time period from when an activation signal is received (t0) to when the vehicle reaches a target speed.

The second processor is described.

Even when an initial phase alignment of the rotor is performed by the first processor 18, a phase shift may occur again (A) because the rotor is rotated due to intake air flowing into an impeller of the compressor 9 connected to the rotor, or (B) because the rotor is rotated due to a disturbance such as vibration. Thus, from when an initial phase alignment has been completed to when an activation signal is received, the second processor 19 causes a holding current to be output to the inverter 11, the holding current maintaining the magnetic pole of the rotor of the electric motor 10 at a position (predetermined position) with which the magnetic pole is aligned with respect to the stator upon the initial phase alignment. In other words, microcurrent that maintains a phase is applied constantly, so as to prevent a phase shift of the rotor due to intake air or a disturbance. The second processor 19 serves as a phase holding unit.

(5) From when an initial phase alignment of the rotor has been completed by the first processor 18 (the first processing) to when an activation signal is received from the activation control processor 20, the second processor 19 causes a holding current to be output to the inverter 11 so that the rotor will not be rotated due to (A) or (B), the holding current maintaining the magnetic pole of the rotor at the predetermined position. This holding current permits preventing of a phase shift of the rotor due to, for example, (A) or (B).

Figure 4:
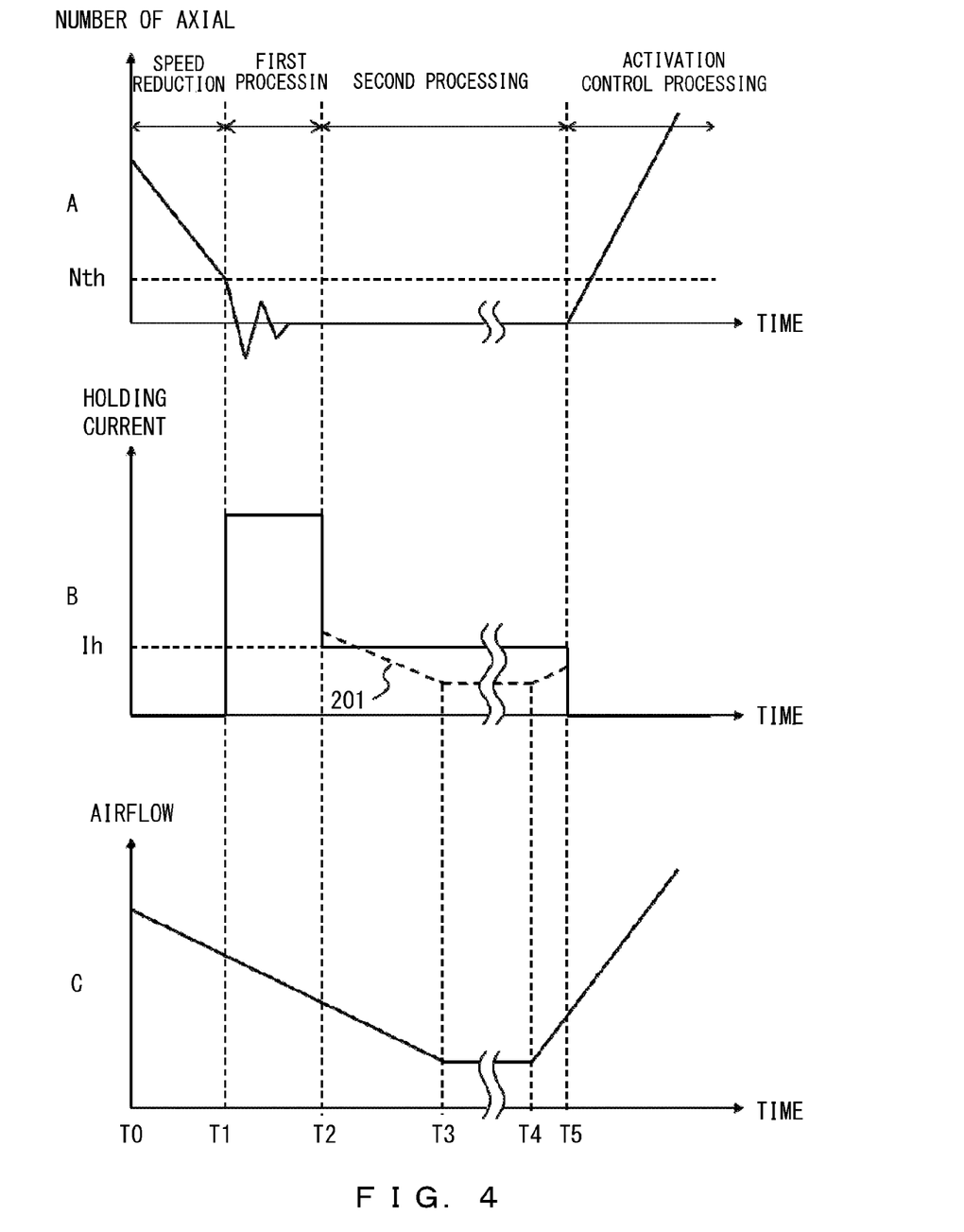
FIG. 4 is a diagram for explaining first processing and second processing.

FIG. 4 is a diagram for explaining the first processing and second processing. Horizontal axes of A to C of FIG. 4 each represent a time, and a vertical axis of A of FIG. 4 represents the number of axial rotations (or it may represent a speed of rotation). A vertical axis of B of FIG. 4 represents a holding current (an excitation current), and a vertical axis of C of FIG. 4 represents an airflow rate.

When a vehicle reduces its speed as illustrated in A of FIG. 4 and the number of axial rotations N is equal to the predetermined number of rotations Nth that indicates a limit for detecting an induced voltage (T1), the first processing is performed to align the magnetic pole of the rotor with a predetermined position with respect to the stator (a time period from T1 to T2). When the first processing has been completed (T2), the second processing is performed to cause a holding current Ih (a solid line) to be output to the inverter 11, the holding current maintaining the magnetic pole of the rotor at the predetermined position (a time period from T2 to T5). The holding current Ih is an excitation current predetermined as a result of an experiment or a simulation, such that the position of the rotor is not shifted due to, for example, (A) or (B). When the inverter 11 receives an activation signal (T5), activation control processing is started.

(6) If the second processor 19 performs the processing described in (5), it is possible to prevent a phase shift of the rotor due to (A) or (B), but the holding current Ih (the solid line) needs to flow until an activation signal is received. Thus, in order to reduce power consumption due to the holding current, a control is performed that increases or decreases the holding current according to the amount of air taken in by the electric supercharger 4 of the vehicle. In other words, the inflow of air taken in by the impeller of the compressor 9 connected to the rotor (described above by (A)) is monitored using, for example, a flowmeter 21, and the holding current is changed according to the intake airflow rate measured by the flowmeter 21. For example, information in which an intake airflow rate and a holding current are associated is referred to and the holding current is determined, wherein the information is created in advance as a result of an experiment or a simulation, using the measured intake airflow rate. The installation position of the flowmeter 21 is not limited to the position illustrated in FIG. 1.

Figure 5:
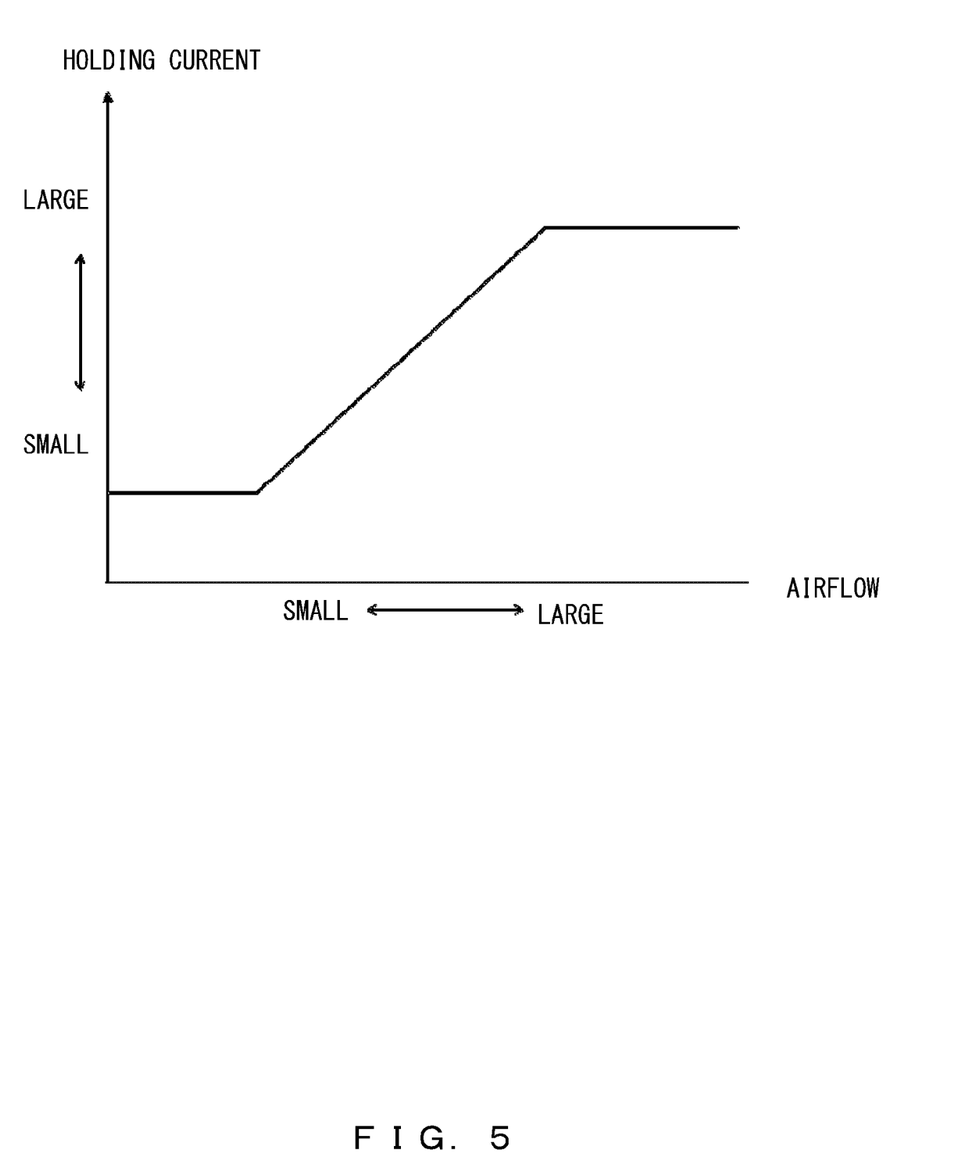
FIG. 5 illustrates a relationship between an airflow rate and a holding current.

FIG. 5 illustrates a relationship between an airflow rate and a holding current. The information in which an intake airflow rate and a holding current are associated is created on the basis of, for example, the graph illustrated in FIG. 5. A vertical axis in FIG. 5 represents the holding current, and a horizontal axis represents the airflow rate. If the airflow rate is increased, the holding current is increased, and if the airflow rate is reduced, the holding current is decreased.

In C of FIG. 4, the airflow rate is reduced for a time period from T0 to T3. Further, in A and B of FIG. 4, the first processing was completed at T2. Thus, the information created on the basis of FIG. 5 is referred to and the holding current Ih is increased or decreased until an activation signal is received (a time period from T2 to T5). In other words, if a holding current 201 (a dashed line) illustrated in B of FIG. 4 is controlled, a constant holding current Ih (a solid line) is caused to flow in the processing in (5), but, in the processing in (6), it is possible to increase or decrease the holding current according the intake airflow rate, so power consumption can be reduced.

Further, an opening and closing control for preventing a phase shift that has been conventionally performed by a valve 22 situated at an intake of the electric supercharger 4 does not have to be performed, so it is possible to increase the life of the valve.

Further, it is also possible to suppress the rotation of the impeller, so it is possible to increase the lives of bearings used for axes that are provided in the compressor 9 and the electric motor 10 of the electric supercharger 4.

A control of the inverter that is performed by the controller 5 is described.

Figure 6:
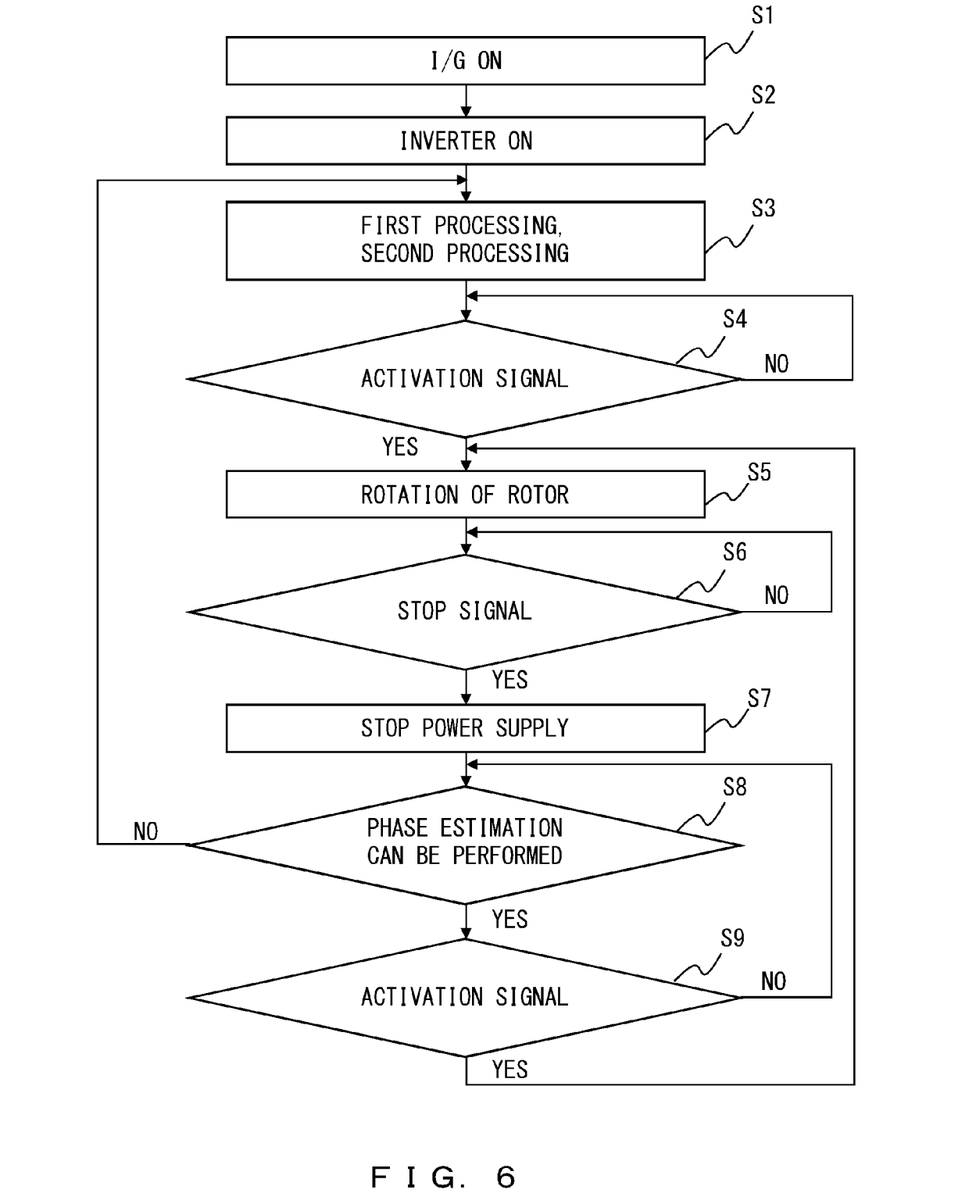
FIG. 6 is a flowchart that illustrate an example of an operation of a controller.

FIG. 6 is a flowchart that illustrates an example of an operation of the controller.

When it detects, in Step S1, that an ignition switch of a vehicle has been turned on (I/G ON), the controller 5 causes, in Step S2, the second battery 12 to supply power to the inverter 11 so as to energize the inverter 11 (inverter ON). When the processes of Steps S1 and S2 have been completed, the parked vehicle enters a movable state.

In Step S3, the controller 5 causes the inverter 11 to perform a control such that an initial phase alignment of the magnetic pole of the rotor of the electric motor 10 is performed with respect to the stator (the first processing). For example, when the electric motor 10 is asynchronous motor, power is supplied to the winding of the stator so as to align the magnetic pole of the rotor with a predetermined position. However, the method for detecting a phase is not limited to this method. After the first processing is performed, the second processing is performed. In the second processing, from when the first processing has been completed to when an activation signal is received, the controller 5 causes a holding current to be output to the inverter 11, the holding current maintaining the magnetic pole of the rotor of the electric motor 10 at a position (the predetermined position) with which the magnetic pole is aligned with respect to the stator upon an initial phase alignment.

In Step S4, when the controller 5 detects an activation signal (Yes), the process moves on to Step S5, and when the controller 5 does not detect an activation signal (No), the process waits for an activation signal to be detected in Step S4. For example, in the case of the electric motor 10 provided to the electric supercharger 4 of the vehicle, the activation signal is a signal that is transmitted to the inverter 11 when the activation control processor 20 of the controller 5 detects that the amount of pressing down on the accelerator is not less than a predetermined amount of pressing down on the accelerator.

When an activation signal is detected in Step S4, in Step S5, the controller 5 transmits, to the inverter 11, an instruction including information that causes the number of rotations of the rotor of the electric motor 10 to reach a target number of rotations. After it receives the instruction, the inverter 11 activates the electric motor 10 and causes the number of rotations of the rotor to reach the target number of rotations.

In Step S6, when the controller 5 detects a stop signal (Yes), the process moves on to Step S7, and when the controller 5 does not detect a stop signal (No), the process waits for a stop signal to be detected in Step S6. For example, the stop signal is a signal that stops the electric supercharger 4 when the rotor of the electric motor 10 reaches the target number of rotations and the supercharger 3 starts operating effectively.

In Step S7, the controller 5 stops the power supply from the inverter 11 to the electric motor 10. Although the power supply is stopped in Step S7, the rotation of the rotor of the electric motor 10 is not stopped immediately due to inertia but continues (free running).

In Step S8, the controller 5 determines whether a phase estimation can be performed, and when a phase estimation can be performed (Yes), the process moves on to Step S9, and when a phase estimation is not performed (No), the process moves on to Step S3.

In Step S9, when an activation signal is received in a state in which a phase estimation can be performed (Yes), the process moves on to Step S5 and the activation control processor 20 of the controller 5 instructs the inverter 11 to activate the electric motor 10. When there exists no activation signal in a state in which a phase estimation can be performed (No), the process moves on to Step S8.

In Steps S7 to S9, when the rotor of the electric motor 10 is rotated upon receiving an activation signal and then the number of rotations of the rotor reaches the target number of rotations, the power supply from the inverter 11 to the electric motor 10 is stopped. However, the rotation of the rotor is not stopped immediately due to inertia (free running). However, when the number of rotations of the rotor is not greater than the predetermined number of rotations while free running, it is not possible to perform a phase estimation. For example, when the inverter 11 monitors an induced voltage of the electric motor 10 to perform a phase estimation of the rotor, the induced voltage is proportional to the number of rotations, so it is not possible to perform a phase estimation when the number of rotations of the rotor is not greater than the number of rotations that indicates a limit for detecting an induced voltage. At this point, if a phase detection is performed after a new activation signal is received (t0) as is conventional, the inverter 11 delays rotating the rotor of the electric motor 10 by the time period for phase detection (ts). Thus, if a phase detection is forcibly performed when the number of rotations of the rotor is not greater than the predetermined number of rotations Nth, this results in shortening a time period from when an activation signal is received (t0) to when the rotor reaches the target number of rotations.

It is sufficient if the electric motor is a sensorless one, and the control described above is applicable to an electric motor used to reach a target number of rotations in a short time.

The present invention is not limited to the embodiments described above, and various modifications and alterations may be made thereto without departing from the spirit and scope of the invention.

REFERENCE SIGNS LIST 1 device
2 internal combustion engine
3 supercharger
4 electric supercharger
5 controller
6 alternator
7 first battery
8 DC/DC converter
9 compressor
10 electric motor
11 inverter
12 second battery
14 output axis
15 drive wheel
16,17 pipe
18 first processing
19 second processing
20 activation control processor
21 flowmeter
22 valve

The invention claimed is:

1. An electric motor control device: comprising:
an inverter configured to supply power to an electric motor that is a sensorless electric motor provided in a vehicle, so as to drive the electric motor; and
a controller configured to control the inverter, wherein
the controller energizes the inverter upon detecting that an ignition switch has been turned on,
after the inverter is energized and before an activation control processor of the controller transmits, to the inverter, an activation signal that activates the electric motor, a phase detection unit of the controller causes the inverter to perform an initial phase alignment that aligns a magnetic pole of a rotor of the electric motor with a predetermined position with respect to a stator, and
during a period from the phase detection unit causing the inverter to perform the initial phase alignment to the activation control processor transmitting the activation signal to the inverter, a phase holding unit of the controller causes a holding current to be output to the inverter, the holding current holding the magnetic pole of the rotor of electric motor at the predetermined position with respect to the stator, wherein
after the inverter that has received the activation signal drives the electric motor such that the number of rotations of the rotor reaches a target number of rotations, the phase detection unit causes the inverter to perform the initial phase alignment when the number of rotations of the rotor is not greater than a predetermined number of rotations.

2. The electric motor control device according to claim 1, wherein
after the number of rotations of the rotor is not greater than the predetermined number of rotations and the phase detection unit causes the inverter to perform the initial phase alignment, the phase holding unit causes a holding current to be output to the inverter, the holding current holding the magnetic pole of the rotor at the predetermined position.

3. The electric motor control device according to claim 2, wherein
the electric motor control device controls the inverter provided in an electric supercharger and the electric motor, and
the phase holding unit causes the holding current to be increased or decreased according to an amount of intake air obtained by measuring the inflow of air taken in by an impeller of a compressor connected to the rotor, and causes the holding current to be output to the inverter.

4. The electric motor control device according to claim 1, wherein
the electric motor control device controls the inverter provided in an electric supercharger and the electric motor.

\* \* \* \* \*